United States Patent
Cooper et al.

(10) Patent No.: US 6,818,164 B1
(45) Date of Patent: Nov. 16, 2004

(54) METHOD OF MAKING A COSMETIC COVER

(75) Inventors: Robin Anthony Cooper, Surrey (GB); Nigel Barker, West Sussex (GB); Roy Knox, West Yorkshire (GB)

(73) Assignee: Hugh Steeper Limited, Kent (GB)

(*) Notice: Subject to any disclaimer, the term of this patent is extended or adjusted under 35 U.S.C. 154(b) by 123 days.

(21) Appl. No.: 09/689,722

(22) Filed: Oct. 13, 2000

(30) Foreign Application Priority Data

Oct. 15, 1999 (GB) .............................. 9924384

(51) Int. Cl.[7] .............................................. B29C 41/04
(52) U.S. Cl. .................... 264/73; 264/247; 264/255; 264/267; 264/271.1
(58) Field of Search ............................ 264/271.1, 267, 264/73, 74, 247, 255

(56) References Cited

U.S. PATENT DOCUMENTS

| | | |
|---|---|---|
| 3,678,141 A | 7/1972 | Metcalfe et al. |
| 4,895,690 A | 1/1990 | LaRoche et al. |
| 5,762,796 A | 6/1998 | Zraik |
| 5,823,891 A | 10/1998 | Winskowicz |
| 5,965,072 A * | 10/1999 | Hesler .......................... 264/14 |
| 6,187,244 B1 * | 2/2001 | Fishel et al. ................ 264/293 |

FOREIGN PATENT DOCUMENTS

| | | | |
|---|---|---|---|
| DE | 3813851 | * | 11/1989 |
| EP | 1379130 | | 4/1972 |
| EP | 0860300 | | 8/1998 |
| GB | 2237238 A | * | 5/1991 |
| JP | 62-204908 A | * | 9/1987 |
| JP | 7-241916 | * | 9/1995 |
| WO | 97/24089 | | 7/1997 |

* cited by examiner

*Primary Examiner*—Edmund H. Lee
(74) *Attorney, Agent, or Firm*—Clark & Brody

(57) ABSTRACT

A method of making a cosmetic cover includes coating the interior of a mold with successive layers of one or more curable materials. An outer such layer is provided with means to create a non-homogeneous color effect in that layer, and at least an inner such layer is provided with means to create a background color, for the said outer layer, in the said inner layer.

6 Claims, 2 Drawing Sheets

METHOD OF MAKING A COSMETIC COVER

TECHNICAL FIELD

The present invention relates to a method of making a cosmetic cover comprising coating the interior of a mould with successive layers of one or more curable materials.

BACKGROUND ART

Such a method has already been proposed in which each layer contains different pigments at different loadings to produce the desired overall colouring for the cover.

One disadvantage of a cover made by such a method is that the colouring is not very realistic.

It is an aim of the present invention to obviate this disadvantage.

SUMMARY OF THE INVENTION

Accordingly, the present invention is directed to a method as set out in the opening paragraph of the present specification, in which at least an outer such layer is provided with means to create a non-homogeneous colour effect in that layer, and at least an inner such layer is provided with means to create a background colour, for the said outer layer, in the said inner layer.

It will be appreciated here that the outermost layer of the cover is the layer which is first-formed in the moulding.

The total number of layers with which the interior of the mould is coated may be three or more.

The said one or more curable materials may comprise a liquid monomer. Alternatively, or in addition, the said one or more materials may comprise a semi-liquid monomer.

The said means to create a non-homogeneous colour effect may be in the form of coloured lengths of fibres. Alternatively, they may comprise a variation in the thixotropy of the said one or more curable materials. Alternatively, the means to create a non-homogeneous colour effect may comprise dye-containing capsules having a form which will allow the passage of dye material within them into the layer during or after the curing process. Thus, the passing of the dye into the layer from the capsules may be caused by the curing process itself, or alternatively for example upon the exposure of the layer to sunlight.

Alternatively, such dyes could be introduced as solids, such as powders or crystals, or liquids directly into the layer.

The dyes used might be sensitive to light, such as for example polychromatic dyes.

The present invention extends to a method of making a coloured layer of material comprising introducing a dyestuff in a curable or cured layer to provide a non-homogeneous coloured layer.

The present invention also extends to a method of making a coloured layer of material comprising varying the thixotropy of one or more curable materials from which such a layer is made, thereby to produce a non-homogeneous colour effect in the layer.

An example of a method of making a cosmetic cover in accordance with the present invention is illustrated in the accompanying diagrammatic drawings, in which:

DETAILED DESCRIPTION OF THE INVENTION

Figure 1:
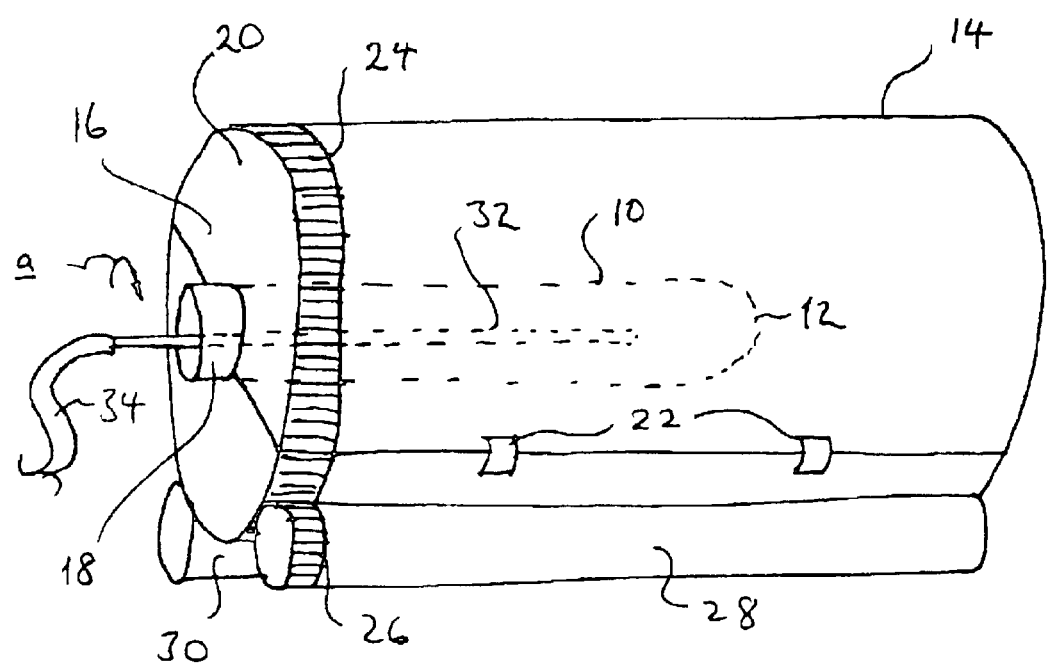
FIG. 1 shows an elevational perspective side view of apparatus for effecting the method.

FIG. 1 shows an elongate mould 10 with a closed generally hemispherical base 12 held on an axis of a rotary drum 14 by means of foam packing 16 between the walls of the drum 14 and the mould 10. The mould 10 has an outer open end 18 projecting beyond front end faces 20 of the foam packing 16. To assist in the insertion of the mould 10 in the foam packing 16 within the drum 14, the drum is in two halves, which are hinged together and which are held in a closed position by means of toggle clamps 22.

Around the periphery of the drum 14 at its forward end, there is a toothed drive ring 24 engaged by a toothed wheel 26 of a drive roller 28. The drum 14 is also supported by an idle roller 30 spaced apart horizontally from the drive roller 28.

A probe 32 extends axially within the mould 10 to feed warm air into the interior thereof, which enters the probe 32 from a tube 34 connected to a source of warm air (not shown).

When the apparatus is used, the mould 10 outside the drum 14 is filled with a curable silicone fluid. The mould 10 is then emptied, the viscous nature of the silicone fluid being such as to leave a coating on the interior of the mould 10.

The latter is then placed in the foam packing 16 of the drum 14 as shown in FIG. 1 and the drum 14 is rotated by the drive roller 28 about the axis of the drum, as shown by the arrow a in FIG. 1. Simultaneously, hot air is fed through the hose 34 into the probe 32, from which it exits into the interior of the mould 10. Eventually, hot air along with the solvent vapour of the silicone fluid escapes through the open end 18 of the mould 10. During this process strongly coloured short-length fibres are fed into the interior of the mould 10. This may be accomplished through the same probe 32. It produces a non-homogeneous colour effect in the layer thus formed. Eventually, the silicone gels to form a first layer on the interior of the mould 10.

The mould 10 is now removed from the drum 14, and is once again filled with silicone fluid, which again is then tipped out from the mould 10. This further amount of fluid silicone is dyed uniformly to provide a background colour for the layer already created.

Figure 2:
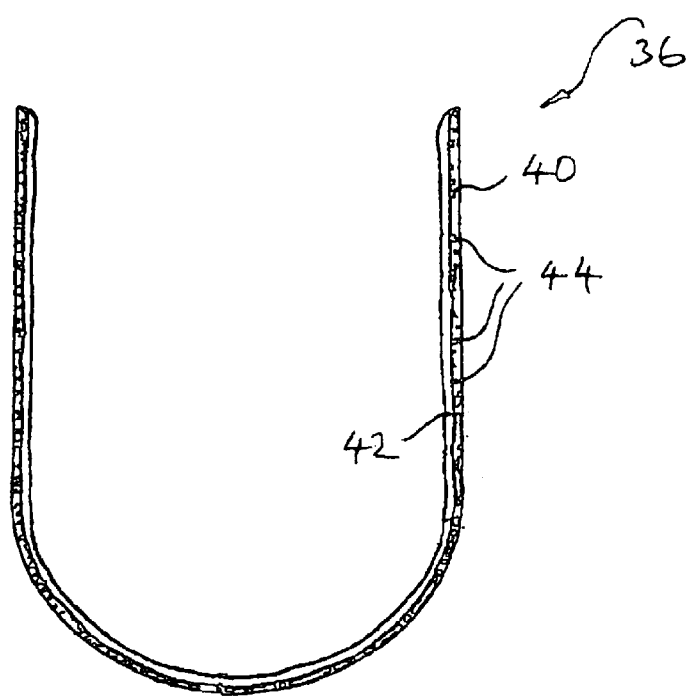
FIG. 2 shows an axial sectional view of a product of that method.

The second layer of silicone is gelled in the same way as the first, by placing the mould in the drum 14, rotating the latter and simultaneously passing hot air into the interior of the drum 14. The resulting cured silicone layers are then removed from the mould 10. They constitute a cover as shown in FIG. 2 having an outer layer 40 and an inner layer 42. The outer layer has a non-homogeneous colour effect created by the presence of the non-uniformly distributed fibres 44. The cover 36 also has an inner layer 42 providing a background colour for the outer layer 40. This cover 36 has a realistic skin-like appearance and is therefore particularly suitable for a prosthesis.

In an alternative method of creating such a cover, which will not now be described with reference to any particular Figures in the drawings, a mould like the mould 10 is heated in an oven. It is then removed from the oven and vinyl chloride monomer is poured into the mould. The mould is then emptied and the mould with a layer of the monomer on its interior, is replaced in the oven.

Either just before or during the heating of this layer of monomer, brightly coloured short-length fibres are scattered on to this layer so as to produce a non-homogeneous colour effect in that layer.

Once the layer of monomer has polymerised to become polyvinyl chloride, the mould is removed from the oven and a further amount of vinyl chloride monomer is poured into the mould to fill the latter. The liquid monomer is again tipped out so that the second layer of the monomer is left on the polymerised layer. This second layer is uniformly covered with a dye to create a background cover for the first layer. The mould is then re-inserted into the oven and the second layer is polymerised. Once the curing process is complete, the cover is removed from the mould and, although it is made of a different substance, looks substantially the same as the cover shown in FIG. 2.

Numerous variations and modifications to the illustrated method may occur to the reader without taking the resulting method outside the scope of the present invention. For example, there may be three or more layers altogether in the finished cover, providing there is at least one outer layer having a non-homogeneous colour effect, and at least one inner layer providing a background colour. Further printing may be applied on the exterior of the cover 36 shown in FIG. 2 to enhance the overall colouring effect even further. Alternatively, further colouring could be injected into the surface of the cover 36 to this end.

The fluid silicone or vinyl chloride monomer and resulting cured material in the layer 40 itself has no pigment loading, or a very low pigment loading, the final colouring effect in the layer 40 being effected substantially solely by the strongly coloured short fibres 44 in these examples.

Materials other than polyvinyl chloride may be used to create the layers. Silicone or polyurethane could be used.

Curing of the monomer may be by chemical means rather than by heating.

The mould 10 may be of a different shape, and may comprise more than one part.

We claim:

1. A method of making a cosmetic cover having successive layers of one or more curable materials by coating the interior of a mold with said successive layers, at least an outer layer of said successive layers creating a non-homogeneous color effect, and at least an inner layer of said successive layers creating a background color effect for said outer layer, comprising the steps of coating the interior of said mold with said outer layer, applying colored lengths of fibers to said outer layer by feeding said colored lengths of fibers into said interior through a probe extending into said interior to create said non-homogeneous color effect, and coating the interior of said mold with said inner layer to create said background color effect.

2. A method of making a cosmetic cover according to claim 1, wherein the total numbers of layers with which the interior of the mould is coated is three or more.

3. A method of making a cosmetic cover according to claim 1, wherein the said one or more curable materials comprise a liquid monomer.

4. A method of making a cosmetic cover according to claim 1, wherein the said one or more curable materials comprise a semi-liquid monomer.

5. A method according to claim 1, wherein said step of feeding said colored lengths of fibers into the mold by way of the probe is independent of the coating steps.

6. A method according to claim 1 further comprising the step of feeding hot air into said mold through said probe.

* * * * *